No. 689,126. Patented Dec. 17, 1901.
G. H. ROBERTS, Sr.
NUT LOCK.
(Application filed Sept. 14, 1901.)
(No Model.)

WITNESSES:
A. R. Appleman
Hartwell P. Meath

INVENTOR
George H. Roberts, Sr.
BY J. R. Littell
his ATTORNEY.

UNITED STATES PATENT OFFICE.

GEORGE H. ROBERTS, SR., OF NEW YORK, N. Y.

NUT-LOCK.

SPECIFICATION forming part of Letters Patent No. 689,126, dated December 17, 1901.

Application filed September 14, 1901. Serial No. 75,397. (No model.)

*To all whom it may concern:*

Be it known that I, GEORGE H. ROBERTS, Sr., a citizen of the United States, residing at New York, in the county and State of New York, have invented certain new and useful Improvements in Nut-Locks, of which the following is a specification.

This invention relates to nut-locks, and has for its object to provide an improved device of this class which will operate to effectually lock the nut against unscrewing and which will positively maintain the bolt and nut in centered arrangement in connection with the work, whereby looseness and its attendant difficulties will be obviated.

A prominent object of the invention is the provision of an improved nut-lock which will be of simple and inexpensive construction and durable as well as highly efficient in use.

Figure 1:
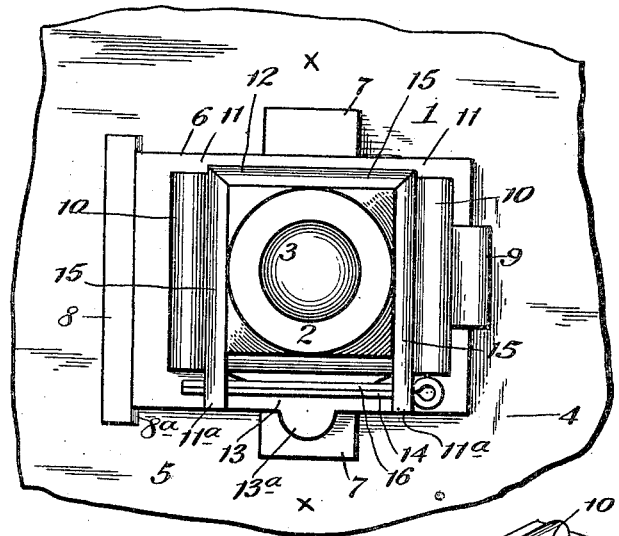
Figure 3:
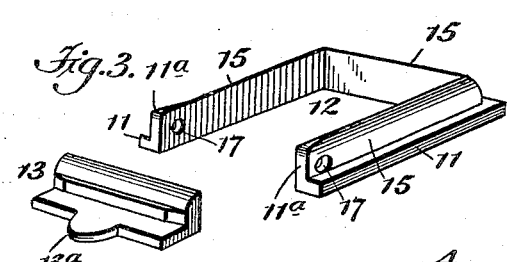
Figure 4:
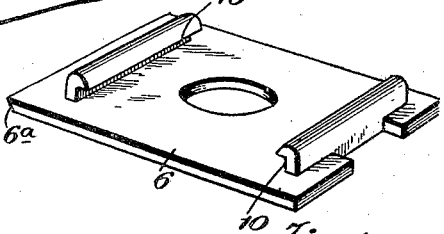
Figure 2:
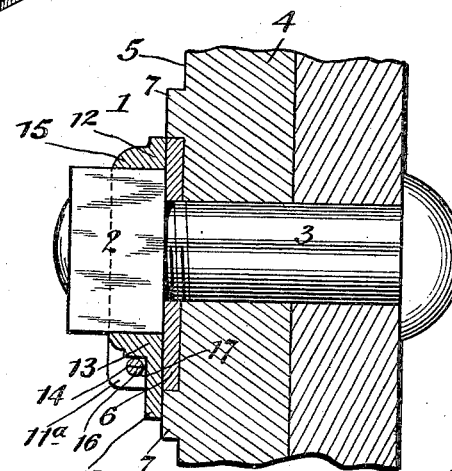

In the drawings, Figure 1 is a face view of my improved nut-lock, showing the same in use. Fig. 2 is a vertical view of the parts illustrated in Fig. 1, the section being taken in the plane indicated by the dotted line $x\ x$ of said figure. Fig. 3 is a detail view of the locking-frame, including its detachable member; and Fig. 4 is another detail view illustrating more particularly the novel arrangement of stops and base-plate.

Corresponding parts in all the figures are denoted by the same reference characters.

Referring to the drawings, 1 designates my improved nut-lock, which is employed in the customary manner in connection with the nut 2, the bolt 3, and the work 4, which latter in the present instance has a flat outer face 5, against which the nut-lock bears in operative relation to the same and to the nut.

The improved nut-lock embodies a base-plate 6, preferably rectangular in shape and having a hole for the passage of the bolt 3, said plate bearing against the flat outer face 5 of the work. This base-plate 6 coacts with a series of stops 7 7, 8, and 9 upon the work to prevent the displacement of the plate and other parts associated therewith. By reference to Figs. 1 and 4 it will be noted that the stops 7 7 are simply small rectangular blocks bearing against the vertical edges of the plate 6 at opposite sides of the same. The stop 8, however, is of extended character and presents an inwardly-inclined edge $8^a$, against which bears the undercut beveled edge $6^a$ of the plate 6. At the opposite side of the plate 6 is the stop 9, which is higher than the other stops and is designed to fit snugly in a recess therefor in the adjacent edge portion of the plate. Integrally on the plate 6 and contiguous to the stops 8 9 are guideways 10 10, which have under channels for the reception of flanges 11 11 on two sides of a locking-frame 12. This locking-frame which embraces the nut and coacts with the guideways upon the plate 6 to prevent the lateral displacement of the nut and bolt and the unscrewing of the former is provided with a detachable member 13, which is associated with the remaining portions of the frame after the latter has been operatively positioned, and fastening means 14 are provided for securing the locking-frame in operative assembled position.

In the preferred form of construction the locking-frame 12 when considered independently of the detachable member 13 consists of a series of side members 15, the number of which is one less than the number of faces of the nut and which are formed to closely engage with the faces of the nut. The side members are rigidly secured together at their ends and extend relatively at the angles determined by the polygonal formation of the nut. The detachable side member 13, which slides upon the base-plate, fits between the free ends $11^a$ of the terminal side members, so as to bear against the adjacent face of the nut. Said detachable member has an outwardly-extending wing $13^a$, which lies upon the base-plate in position for convenient engagement for the manipulation of the detachable side member to insert or withdraw it from operative position.

The fastening means may consist of a spring key-pin 16, which is inserted through openings 17, formed in the free ends $11^a$ of the terminal side members after the detachable member 13 has been inserted in operative position and prevents the displacement of the latter.

Where the nut-lock is employed in connection with woodwork, the base-plate can be provided with lugs adapted to enter openings in the work.

The operation and advantages of my improved nut-lock will be readily understood.

It being comprehended that the several stops 7, 7, 8, and 9 project integrally from the face of the work, the plate 6 can be forced inward toward the work and into position between the stops, so that stop 9, which fits in the edge recess in said plate, not only prevents movement in the direction of the arrow, Fig. 1, but also assists in preventing movement in either direction at right angles thereto. The bevel bearing against the stop 8, while effectively preventing movement opposite to that indicated by said arrow, also affords sufficient frictional resistance at this side of the plate to aid in holding it against the work, while but a little effort is required to lift said plate out of position. With the plate adjusted as described and the nut having been firmly secured home upon the bolt with two of the faces of the former in parallelism with the opposed sides of the lock-frame the latter is passed into position around the nut and between the guideways with its flanges in the grooves of the latter. The separate side member 13 is then inserted between the free ends 11ª of the terminal side members to complete the locking-frame, which then surrounds the nut on all its faces. The key-pin 17 is finally connected with the free ends 11ª of the terminal side members and binds the entire locking-frame in completely-assembled form around the nut and in operative position with respect to the secured base-plate and work.

It will be noted that by locating the grooved guideways on the base-plate to coact with the flanges on the locking-frame the device will suffice to lock the ordinary nut, as it will not be necessary to channel or recess the same in any way.

By means of my improved nut-lock the nut is held firmly against unscrewing, as well as lateral movement, the bolt being thus retained effectually in centered arrangement and increased in serviceability and life.

I do not desire to be understood as limiting myself to the details of construction and arrangement as herein described and illustrated, as it is manifest that variations and modifications may be made in the features of construction and arrangement in the adaptation of the device to various conditions of use without departing from the spirit and scope of my invention and improvements. I therefore reserve the right to all such variation and modification as properly fall within the scope of my invention and the terms of the following claims.

Having now described my invention, I claim and desire to secure by Letters Patent—

1. An improved nut-lock, comprising, in combination with a stop having an inner beveled edge and an opposite stop, of a base-plate, provided with an undercut bevel at one edge and a stop-engaging recess at the side opposite thereto, grooved guiding provision on said plate, a locking-frame engaging said provision, and means for detachably securing said frame around the nut.

2. An improved nut-lock, comprising, in combination with a base-plate and its stop provision, of parallel grooved guideways, a locking-frame engaging said guideways and including a detachable member, and means for securing said member and thereby locking the frame around the nut.

3. An improved nut-lock, comprising, in combination with a base-plate and its stop provision, of parallel grooved guideways, a locking-frame including a detachable member and having sides with plain inner faces and outer flanges, the latter engaging said guideways, and means for securing the detachable member and thereby locking the frame around the nut.

4. An improved nut-lock, comprising, in combination with a stop having an inner beveled edge and an opposite stop, of a base-plate provided with an undercut bevel at one edge and a stop-engaging recess at the side opposite thereto; grooved guideways on said plate, a locking-frame including a detachable member and having sides with plain inner faces and outer flanges, the latter engaging said guideways, and means for securing the detachable member and thereby locking the frame around the nut.

In testimony whereof I have signed my name in the presence of the subscribing witnesses.

GEORGE H. ROBERTS, Sr.

Witnesses:
HARTWELL P. HEATH,
J. R. LITTELL.